(12) United States Patent
Ohtsuka et al.

(10) Patent No.: US 8,009,788 B2
(45) Date of Patent: Aug. 30, 2011

(54) MONITORING METHOD AND MONITORING PROGRAM FOR BOILING WATER REACTOR, AND ACOUSTIC DAMPING METHOD FOR BOILING WATER REACTOR

(75) Inventors: Masaya Ohtsuka, Ibaraki (JP); Kiyoshi Fujimoto, Ibaraki (JP); Masaaki Tsubaki, Ibaraki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/670,580

(22) Filed: Feb. 2, 2007

(65) Prior Publication Data

US 2007/0223642 A1    Sep. 27, 2007

(30) Foreign Application Priority Data

Feb. 28, 2006  (JP) .................................. 2006-051765
Feb. 28, 2006  (JP) .................................. 2006-051910

(51) Int. Cl.
*G21C 7/00*   (2006.01)
(52) U.S. Cl. ......... 376/241; 376/298; 376/207; 376/361
(58) Field of Classification Search ................... 376/241, 376/298, 207, 361
See application file for complete search history.

(56) References Cited

U.S. PATENT DOCUMENTS

| 733,548 A * | 7/1903 | Kitou et al. .................. 251/299 |
| 4,150,546 A * | 4/1979 | Collett ........................... 376/211 |
| 4,879,087 A * | 11/1989 | Akiyama et al. ............... 376/216 |
| 6,198,786 B1 * | 3/2001 | Carroll et al. .................. 376/211 |
| 2006/0078081 A1 * | 4/2006 | Bilanin et al. ................. 376/260 |

FOREIGN PATENT DOCUMENTS

JP    2007-155361    6/2007

OTHER PUBLICATIONS

Anan'ev et al., "Special Features of Nuclear Power Stations in Energy Generation", Atomnaya Energiya, vol. 28, No. 4, Apr. 1970, pp. 291-294 (English language translation enclosed).*
NRC Special Inspection Report, 50-265/03-11.
Journal of Engineering for Gas Turbines and Power, Apr. 2004, vol. 126 p. 271-275.
Office Action in JP2006-051765, dated Aug. 25, 2009 (in Japanese) (2 pages).

* cited by examiner

*Primary Examiner* — Rick Palabrica
(74) *Attorney, Agent, or Firm* — Antonelli, Terry, Stout & Kraus, LLP.

(57) ABSTRACT

A boiling water reactor includes a reactor pressure vessel; a steam pipe for transporting steam generated in the reactor pressure vessel out from a steam dome positioned at an upper part of the reactor pressure vessel; a high pressure turbine connected to the steam pipe and driven by the steam; a feedwater heater which heats feedwater supplied to the reactor pressure vessel using bleed steam flowing from the high pressure turbine to the feedwater heater; a bleeding valve which adjusts a flow rate of the bleed steam; and a pressure sensor provided in a main steam line including the steam dome and the steam pipe. The boiling water reactor further includes a monitor and control system which controls an opening degree of the bleeding valve based on a magnitude of fluctuating pressure in the main steam line that is detected by the pressure sensor.

3 Claims, 9 Drawing Sheets

MONITORING METHOD AND MONITORING PROGRAM FOR BOILING WATER REACTOR, AND ACOUSTIC DAMPING METHOD FOR BOILING WATER REACTOR

CROSS REFERENCE TO RELATED APPLICATIONS

This application claims the foreign priority benefit under Title 35, United States Code, §119(a)-(d) of Japanese Patent Applications No. 2006-051910 flied on Feb. 28, 2006 and No. 2006-051765 filed on Feb. 28, 2006 in the Japan Patent Office, the disclosures of which are herein incorporated by reference in its entirety.

BACKGROUND OF THE INVENTION

The present invention relates to a boiling water reactor (BWR) and an acoustic damping method for a boiling water reactor, and more particularly to reliably monitoring and controlling pressure oscillation generated in a main steam line. The present invention also relates to a monitoring method for a boiling water reactor and a storage medium having stored thereon a computer program for monitoring a boiling water reactor.

As one reason for causing pressure oscillation in a main steam line of a boiling water reactor, pressure oscillation caused by acoustic resonance can be considered. In other words, in the main steam line extending from a steam dome of the reactor pressure vessel to a high pressure turbine through a steam pipe, a pressure wave generates due to variations in the flow rate of steam fluid. The generated pressure wave is propagated and reflected within a steam line including the steam pipe. This creates a standing wave (acoustic resonance mode) having large amplitude, and the amplitude of the pressure oscillation may increase, i.e., resonance vibration may occur. Especially, in a power plant where the power generation capacity is increased, since variations in the flow rate of steam become larger due to increased flow rate of steam, a large acoustic resonance often occurs. Such acoustic resonance phenomenon is subject to the pipe arrangement and boundary conditions of the power plant, and therefore every power plant has different vibration characteristics. It is thus difficult to predict frequency, amplitude, and the maximum amplitude of the vibration caused by acoustic resonance.

Therefore, in order to ensure the soundness of the main steam line and other equipment, it is necessary to design the main steam line and the equipment to have sufficient design margin. For this reason, various measures, such as optimizing the flow passage shape for the main steam line and increasing the structural strength of the main stream line, are taken to prevent the pipes and valves in the main steam line or the equipment from being damaged by an increase in pressure oscillation caused by acoustic resonance. These case examples and measures were reported, for example, by Non-patent literature document 1 (NRC SPECIAL INSPECTION REPORT, 50-265/03-11).

Further, Non-patent literature document 2 (Journal of Engineering for Gas Turbines and Power, April 2004, Vol. 126 P. 271-275) also discloses using Helmholtz resonators in the field of thermal power generation for damping acoustic oscillation within the gas turbine combustor.

However, according to the prior art as described above, carryover of moisture that is mixed and carried with steam is measured when a steam dryer is damaged due to acoustic resonance. If the carryover takes a value equal to or higher than the threshold value because of some sort of malfunction in the steam dryer, the operation of the boiling water reactor is stopped. Namely, the boiling water reactor is not particularly provided with any interlock mechanism which can prevent damage to the steam dryer. There has been existed a method for measuring fluctuating pressure, acceleration and strain at the main steam line when the output power of the nuclear power plant is increased, and for stopping the operation of the boiling water reactor based on the results of measurements. However, there is no particular measure for preventing damage of the steam dryer. Further, if the main steam line is designed to have sufficient design margin to prevent damage caused by pressure oscillation caused by acoustic resonance, the equipment cost of the power plant increases in the end. Further, although there is known a method for attenuating acoustic oscillation within the gas turbine combustor using Helmholtz resonators, such a method is not applied or practiced to the usage of Helmholtz resonators for restricting pressure oscillation in the main steam line of the boiling water reactor.

In other words, conventionally, there has been no particular method for monitoring and controlling pressure oscillation in the main steam line in order to prevent damage of the steam dryer in the reactor pressure vessel. If an attempt is made to restrict pressure oscillation, upon increase in the pressure oscillation, by decreasing the flow rate of steam that is generated in the reactor, the operating rate and the generated energy of the power plant will be decreased, leading to a difficulty in obtaining desired electric power output.

In view of the above, the present invention seeks to provide a boiling water reactor and an acoustic damping method for the boiling water reactor, which can efficiently restrict pressure oscillation caused by acoustic resonance generated in the main steam line and prevent the steam dryer, etc. in the reactor pressure vessel from being damaged, without increasing the equipment cost of the power plant or lowering the thermal power of the reactor.

The present invention also seeks to provide a monitoring method and a storage medium having stored thereon a computer program for monitoring a boiling water reactor, which can prevent the steam dryer, etc. in the reactor pressure vessel from being damaged by pressure oscillation caused by acoustic resonance generated in the main steam line.

SUMMARY OF THE INVENTION

In a boiling water reactor according to the present invention, at least one pressure sensor always monitors and checks pressure oscillation in a main steam line including a steam dome and a steam pipe. When the detected pressure oscillation exceeds a threshold value, a monitor and control system decreases the opening degree of a bleeding valve which adjusts a flow rate of bleed steam supplied from a high pressure turbine to a feedwater heater so that the temperature of feedwater to be supplied to the reactor pressure vessel can be lowered. This can decrease the amount of steam generated in the reactor pressure vessel, and therefore, the flow rate of steam passing through the main steam line can be decreased. As a result, pressure oscillation caused by acoustic resonance can be restricted. During this time, a control is made such that a product of a formula given by $Es \times Q$ is constant, where $Es$ is an enthalpy difference based on a difference between a temperature of the feedwater that is supplied to the reactor pressure vessel and a temperature of steam that is transported out from the reactor pressure vessel, and $Q$ is a flow rate of steam that is transported out from the reactor pressure vessel. Therefore, even if the flow rate of steam (Q) is decreased, it is possible to maintain the thermal power of the reactor to a constant value.

Further, in a boiling water reactor according to the present invention, when the detected pressure oscillation exceeds a threshold value, a monitor and control system decreases the opening degree of a bleeding valve which adjusts a flow rate of bleed steam supplied from a high pressure turbine to a feedwater heater so that the temperature of feedwater to be supplied to the reactor pressure vessel can be decreased as well as controls the amount of steam generated in the reactor pressure vessel by controlling control rods for controlling a nuclear fission reaction of uranium fuel. Therefore, while decreasing the flow rate of steam (Q) to restrict pressure oscillation, the enthalpy difference (Es) is enlarged. As a result, it is possible to maintain the generated energy to an appropriate value.

In the above boiling water reactors according to the present invention, pressure oscillation in the main steam line such as at the steam dome and the steam pipe is monitored, and a control is made such that the variation level of the pressure oscillation is not equal to or higher than the threshold value. This makes it possible to prevent a steam dryer or various equipment in the reactor pressure vessel from being damaged.

Further, according to the present invention, there is provided a monitoring method for a boiling water reactor which comprises: a reactor pressure vessel; a steam pipe for transporting steam generated in the reactor pressure vessel out from a steam dome positioned at an upper part of the reactor pressure vessel; and a high pressure turbine connected to the steam pipe and driven by the steam; wherein the method comprises the steps of: monitoring by a monitor system a fluctuating pressure signal from at least one pressure sensor provided in a steam line including the steam dome and the steam pipe; and monitoring the boiling water reactor based on this monitoring result.

In the aforementioned monitoring method, the monitor system may execute the steps of: an analytical studying step for analytically studying an acoustic resonance phenomenon in the steam line and calculating resonance frequency and sound pressure distribution in the steam line; a detected signal analyzing step for processing the fluctuating pressure signal from the pressure sensor and calculating resonance frequency and fluctuating pressure distribution; a determination step for comparing results obtained by the analytical studying step and the detected signal analyzing step and determining whether or not a difference in the comparison is equal to or lower than an allowable difference value; an analytical studying condition changing step for changing an analytical studying condition in the analytical studying step if the difference in the comparison is more than the allowable difference value; a fluctuating pressure distribution calculating step for calculating fluctuating pressure distribution applied to a surface of a structure in the steam line by the analytical studying step if the difference in the comparison is equal to or lower than the allowable difference value; a stress distribution calculating step for calculating stress distribution caused in the structure by the fluctuating pressure distribution applied to the surface of the structure; a threshold pressure amplitude calculating step for calculating a threshold pressure amplitude of the pressure sensor that is required for the structure to reach a fatigue fracture free stress; and a monitoring step for monitoring whether or not fluctuating pressure amplitude obtained by the fluctuating pressure signal from the pressure sensor is equal to or lower than the threshold pressure amplitude.

According to the present invention, it is possible to monitor the boiling water reactor in an appropriate manner so as to prevent the steam dryer and the like in the reactor pressure vessel from being damaged due to pressure oscillation caused by acoustic resonance that is generated in the main steam line.

BRIEF DESCRIPTION OF THE DRAWINGS

The aspects of the present invention will become more apparent by describing in detail illustrative, non-limiting embodiments thereof with reference to the accompanying drawings, in which.

DESCRIPTION OF THE PREFERRED EMBODIMENTS

Overview

Paying attention to the fact that a main factor for pressure oscillation in a main steam line is acoustic resonance, a boiling water reactor according to the present invention prevent an occurrence of acoustic resonance. According to the boiling water reactor, a variation of pressure oscillation in the main steam line is monitored and the temperature (enthalpy) of feedwater flowing into the reactor pressure vessel is controlled so that pressure oscillation does not become equal to or higher than a threshold value. At the same time, a control is made on control rods for controlling nuclear fission product energy of uranium fuel in a core shroud to thereby control the flow rate of steam flowing out from the reactor pressure vessel.

In other words, decreasing the amount of main steam extracted from a high pressure turbine to thereby decrease the heating capacity for feedwater allows the enthalpy (temperature) of the feedwater to be lowered, which leads to a decreased amount of steam generated in the reactor pressure vessel. This makes it possible to decrease the flow rate of steam passing through the main steam line and therefore to restrict pressure oscillation caused by acoustic resonance. During this time, since the enthalpy difference is enlarged based on a temperature difference between the temperature of feedwater at an inlet of the reactor pressure vessel and the temperature of steam at an outlet of the reactor pressure vessel, it is not necessary to decrease the thermal power of the reactor even if the flow rate of steam is decreased. Namely, by controlling the amount of main steam extracted from the high pressure turbine to thereby control the temperature of feedwater to an optimal temperature, even if the flow rate of steam to be output from the reactor pressure vessel is decreased to restrict pressure oscillation, it is not necessary to lower the thermal power of the reactor.

Further, it is possible to maintain the generated energy to an appropriate value by controlling the amount of main steam extracted from the high pressure turbine to thereby enlarge the enthalpy difference as well as by controlling the control rods for controlling a nuclear fission reaction of uranium fuel. In the boiling water reactor according to the present invention, controlling the flow rate of steam to be output from the reactor pressure vessel without decreasing the thermal power of the reactor makes is possible to restrict pressure oscillation caused by acoustic resonance, thereby preventing the steam dryer and various equipment from being damaged.

With reference to the drawings, boiling water reactors according to first and second embodiments will be described in detail.

First Embodiment

Figure 1:
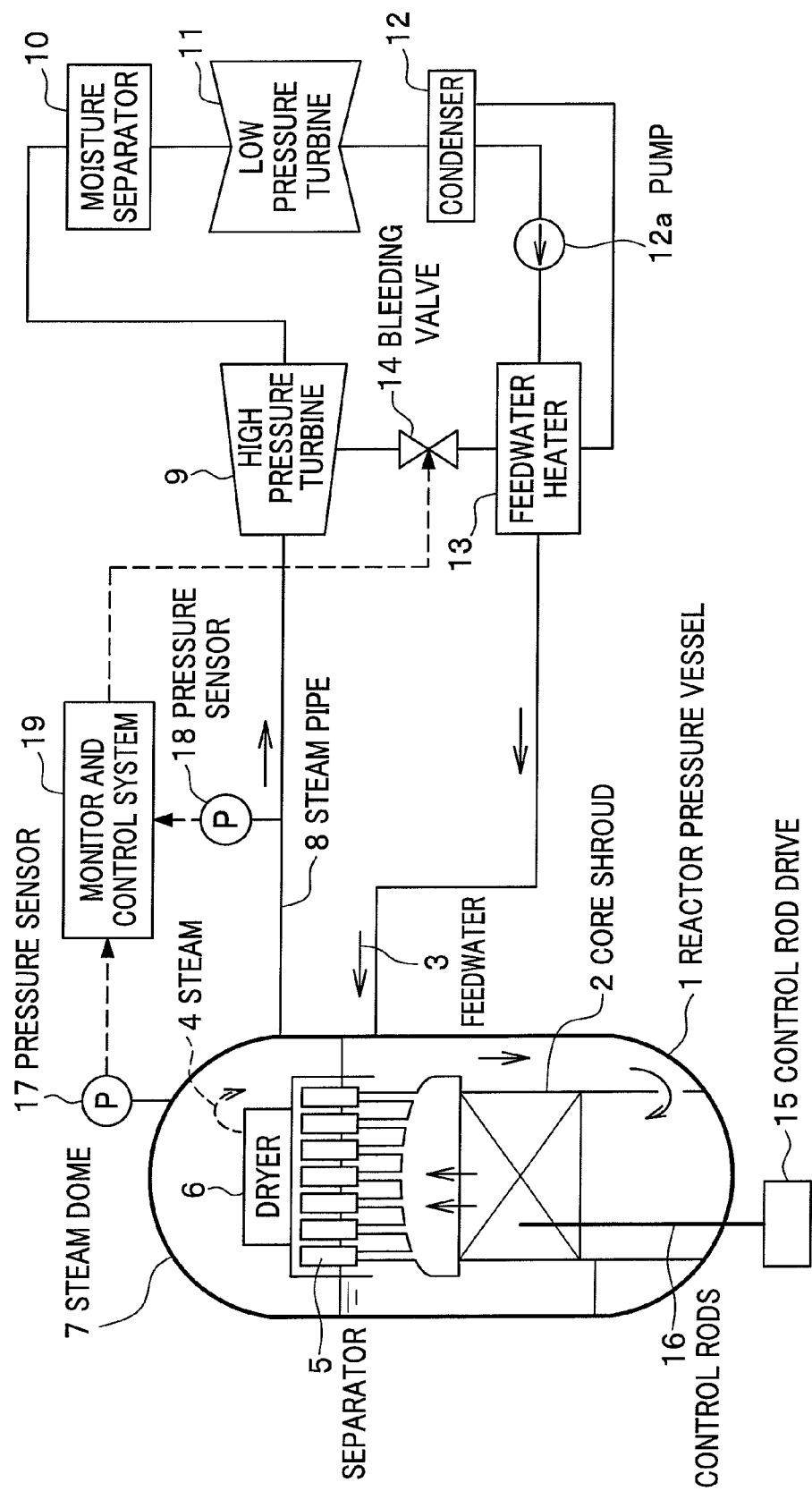
FIG. 1 is a block diagram illustrating a steam line and a feedwater line of a boiling water reactor according to a first embodiment of the present invention.

As shown in FIG. 1, uranium fuel (not shown) is contained in a core shroud 2 inside a reactor pressure vessel 1. When the uranium fuel produces thermal energy by the nuclear fission reaction, feedwater 3 is boiled by the produced thermal energy and generates steam 4. The thus generated steam 4 passes through a separator 5 and a steam dryer (dryer) 6, where moisture thereof is removed, and then flows into a steam dome 7. Moisture removed by the separator 5 is mixed again with feedwater 3. Meanwhile, steam 4 generated inside the reactor pressure vessel flows from the steam dome 7 into a high pressure turbine 9 through a steam pipe 8, and rotates the high pressure turbine at high speeds. Further, steam 4 is discharged from the high pressure turbine 9 and flows through a moisture separator 10 and into a low pressure turbine 11, so that the low pressure turbine 11 is rotated at high speeds. Since the high pressure turbine 9, the low pressure turbine 11, and a generator (not shown) are made into a single-shaft arrangement, the generator can be rotated at high speeds by the rotations of the high pressure turbine 9 and the low pressure turbine 11 to thereby obtain a desired electric power.

Steam 4 passing through the low pressure turbine 11 is then cooled by a condenser 12 and condensed to feedwater 3, which is then supplied to the feedwater heater 13. The feedwater heater 13 is heated by steam 4 that is extracted from the high pressure turbine 9 through a bleeding valve 14, so that feedwater 3 passing through the feedwater heater 13 is preheated to a predetermined temperature and fed again into the reactor pressure vessel 1 by a pump 12a. As described above, feedwater 3 is circulated, and inside the reactor pressure vessel 1 is again boiled to steam 4, which is then fed into the high pressure turbine 9 and the low pressure turbine 11 to rotate the generator at high speeds.

Control rods 16 are attached to a control rod drive 15, and are inserted inside the reactor pressure vessel 1. The control rods 16 are for controlling a nuclear fission reaction of uranium fuel inside the core shroud 2. The control rod drive 15 drives and controls the control rods 16 so that the amount of steam 4 generated inside the reactor pressure vessel 1 can be controlled.

A pressure sensor 17 is provided in the reactor pressure vessel 1. The pressure sensor 17 detects fluctuating pressure inside the steam dome 7. A pressure sensor 18 is also provided in the steam pipe 8. The pressure sensor 18 detects fluctuating pressure inside the steam pipe 8. A signal indicating fluctuating pressure detected by the pressure sensor 17 or the pressure sensor 18 is transmitted to a monitor and control system 19. The monitor and control system 19 controls the opening degree of the bleeding valve 14 based on the magnitude of the fluctuating pressure signal so as to control the amount of steam that is extracted from the high pressure turbine 9 and supplied to the feedwater heater 13. Therefore, the temperature (enthalpy) of feedwater that is supplied to the reactor pressure vessel 1 can be controlled. As a result, the monitor and control system 19 can control the amount of generated steam 4 as well as an input/output enthalpy difference of the reactor pressure vessel 1 based on a difference between the temperature of feedwater 3 at the inlet of the reactor pressure vessel 1 and the temperature of steam 4 at the outlet of the reactor pressure vessel 1.

Figure 2:
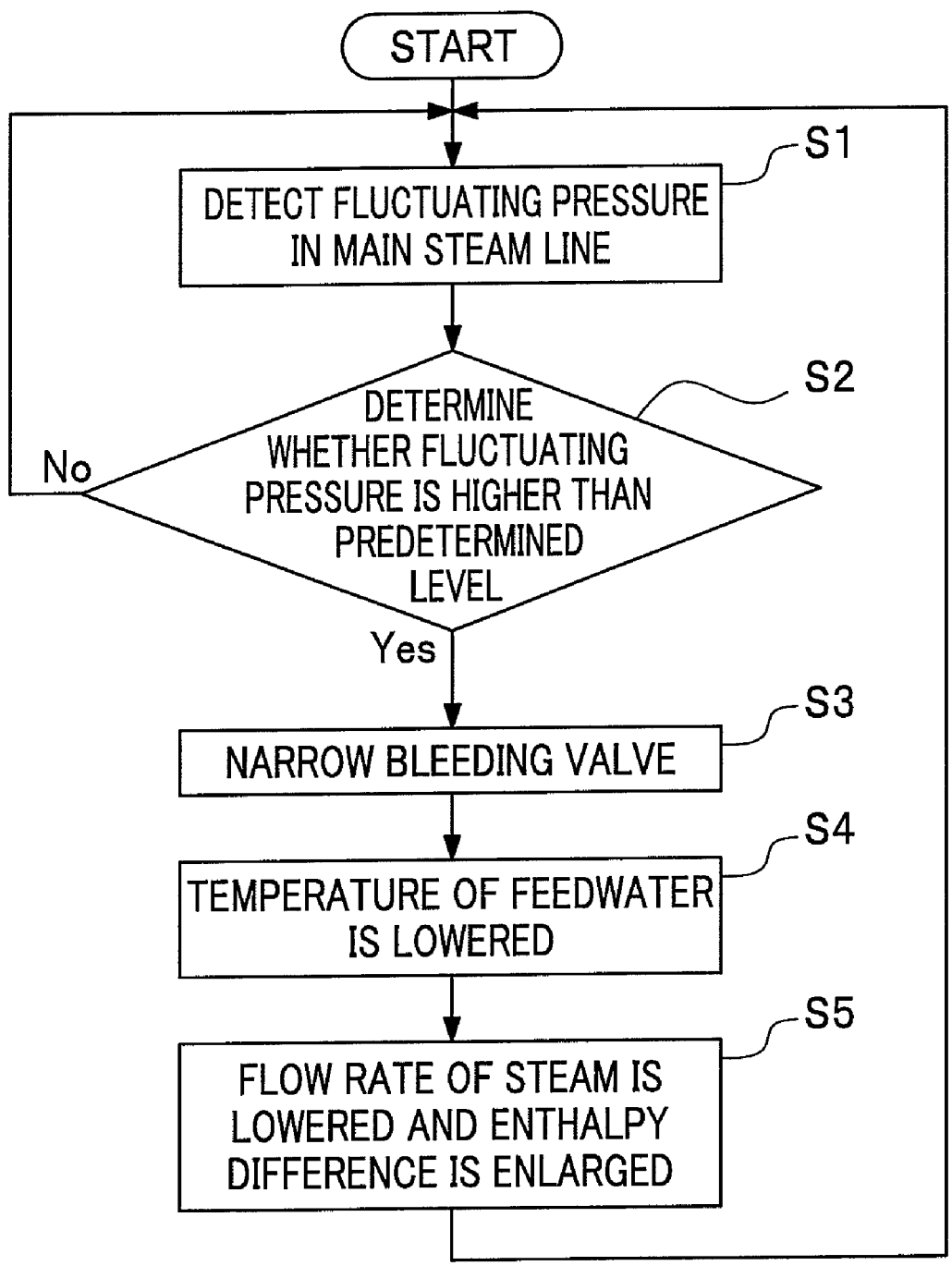
FIG. 2 is a flow chart showing the operation of the boiling water reactor shown in FIG. 1 for restricting pressure oscillation caused by acoustic resonance.

With reference to FIG. 2, the operation of the monitor and control system 19 in a boiling water reactor according to the first embodiment of the present invention will be described in a flow chart, in which the monitor and control system 19 restricts pressure oscillation caused by acoustic resonance while monitoring fluctuating pressure in the main steam line.

In step S1 of the flow chart, the pressure sensor 17 or the pressure sensor 18 detects fluctuating pressure caused by acoustic resonance in the steam dome 7 or the steam pipe 8 (i.e., in the main steam line). The monitor and control system 19 then determines whether or not the detected fluctuating pressure is higher than a predetermined level (step S2). If the detected fluctuating pressure is not higher than the predetermined level, that is, if the fluctuating pressure is small (step S2; No), the pressure sensor 17 and the pressure sensor 18 continuously detect fluctuating pressure. If the detected fluctuating pressure is higher than the predetermined level (step 2; Yes), the monitor and control system 19 narrows or gradually closes the bleeding valve 14 to decrease the amount of steam supplied from the high pressure turbine 9 to the feedwater heater 13 (step S3).

The heating temperature of the feedwater heater 13 lowers by narrowing the bleeding valve 14, and therefore the temperature of feedwater 3 that is supplied from the condenser 12 to the reactor pressure vessel 1 through the feedwater heater 13 lowers (step S4). As a result, the amount of steam 4 generated in the reactor pressure vessel 1 is decreased, and so the flow rate (Q) of steam that is supplied from the steam dome 7 to the steam pipe 8 is also decreased. Further, a temperature difference between the temperature of feedwater 3 supplied to the reactor pressure vessel 1 and the temperature of steam 4 supplied from the reactor pressure vessel 1 to the steam pipe 8 is enlarged. Namely, the enthalpy difference (Es) between the inlet and the outlet of the reactor pressure vessel 1 is enlarged (step S5).

Next, the operation returns to the beginning of the flow chart, and the pressure sensor 17 or the pressure sensor 18 detects fluctuating pressure caused by acoustic resonance (step S1) in the steam dome 7 or the steam pipe 8 (i.e., in the main steam line). The monitor and control system 19 then determines whether or not the detected fluctuating pressure is higher than a predetermined level (step S2). If the detected fluctuating pressure is not higher than the predetermined level, that is, if the fluctuating pressure is small (step S2; No), the pressure sensor 17 and the pressure sensor 18 continuously detect fluctuating pressure. If the detected fluctuating pressure is higher than the predetermined level (step 2; Yes), the monitor and control system 19 further narrows or gradually closes the bleeding valve 14 to decrease the amount of steam supplied from the high pressure turbine 9 to the feedwater heater 13 (step S3).

Thus, decreasing the flow rate of steam flowing from the steam dome 7 to the steam pipe 8 makes it possible to decrease pressure oscillation generated in the main steam line including the steam dome 7 and the steam pipe 8, thereby restricting acoustic resonance.

To be more specific, in the boiling water reactor according to the first embodiment, if fluctuating pressure detected by the pressure sensors 17, 18 provided in the steam dome 7 and in the steam pipe 8 exceeds the predetermined threshold value, the monitor and control system 19 narrows the bleeding valve 14 to restrict a flow of bleed steam flowing from the high pressure turbine 9 to the feedwater heater 13, so that the temperature of feedwater 3 supplied to the reactor pressure vessel 1 is lowered and the flow rate of steam can be lowered. By this operation, it is possible to decrease pressure oscillation caused by acoustic resonance in the steam dome 7 or in the steam pipe 8. During this time, even if the flow rate of steam is lowered, since the input/output enthalpy difference of the reactor pressure vessel 1 is enlarged, it is not necessary to decrease the reactor thermal power defined by multiplying the flow rate of steam by the enthalpy difference.

In the boiling water reactor according to the first embodiment, the monitor and control system 19 controls the bleeding valve 14 as described above, so that the flow rate of steam can be decreased without decreasing the reactor thermal power to thereby restrict pressure oscillation caused by acoustic resonance. Therefore, even if the output power of the nuclear power plant is increased, it is possible to prevent the steam dryer (dryer) 6 or other equipment in the reactor pressure vessel 1 from being damaged.

Second Embodiment

Figure 3:
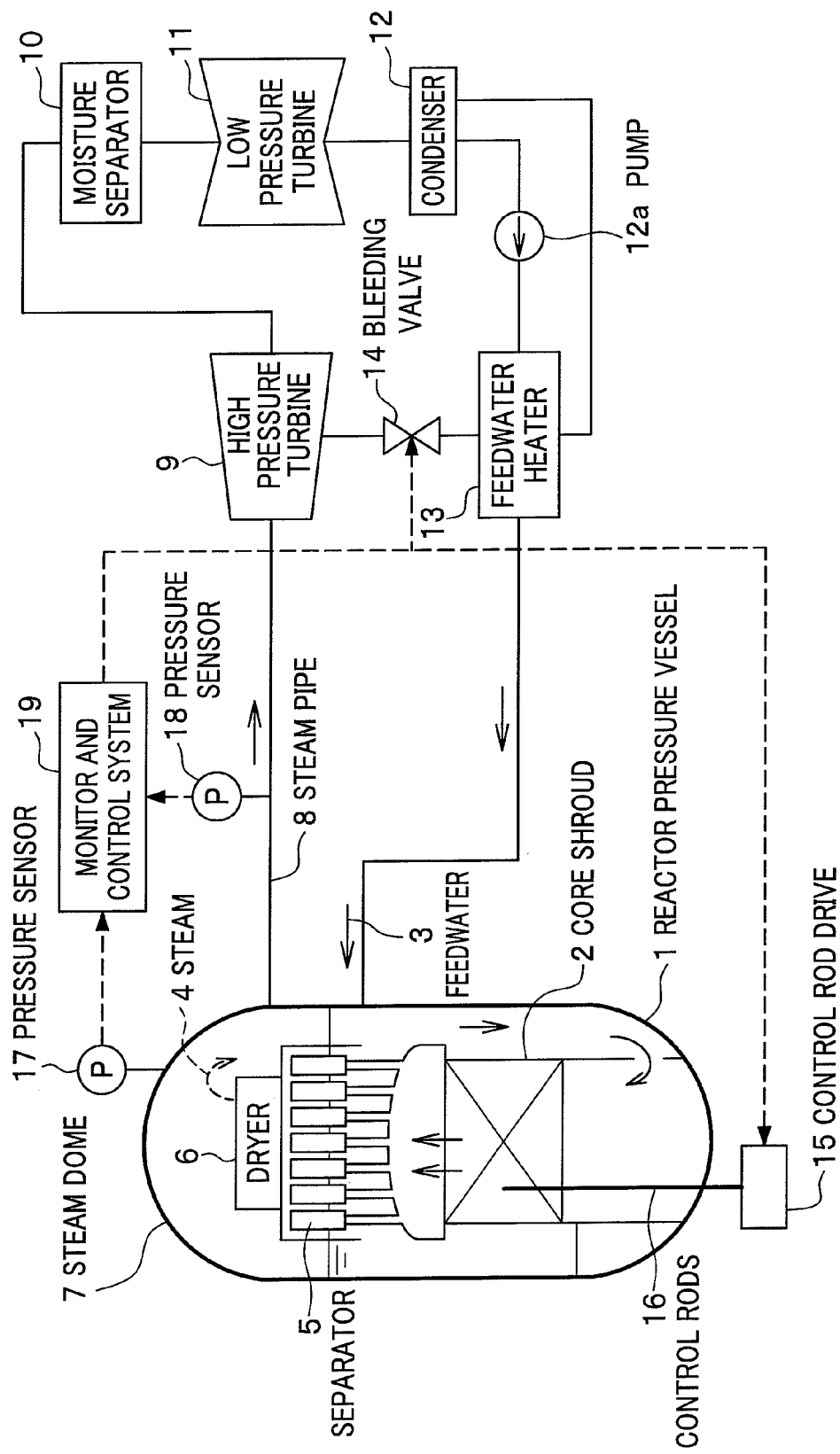
FIG. 3 is a block diagram illustrating a steam line and a feedwater line of a boiling water reactor according to a second embodiment of the present invention.

A boiling water reactor according to the second embodiment as shown in FIG. 3 is substantially the same in construction as the boiling water reactor according to the first embodiment as shown in FIG. 1, except that the monitor and control system 19 further controls the control rod drive 15 in addition to the bleeding valve 14. Parts similar to those previously described in the first embodiment are denoted by the same reference numerals, and detailed description thereof will be omitted.

Figure 4:
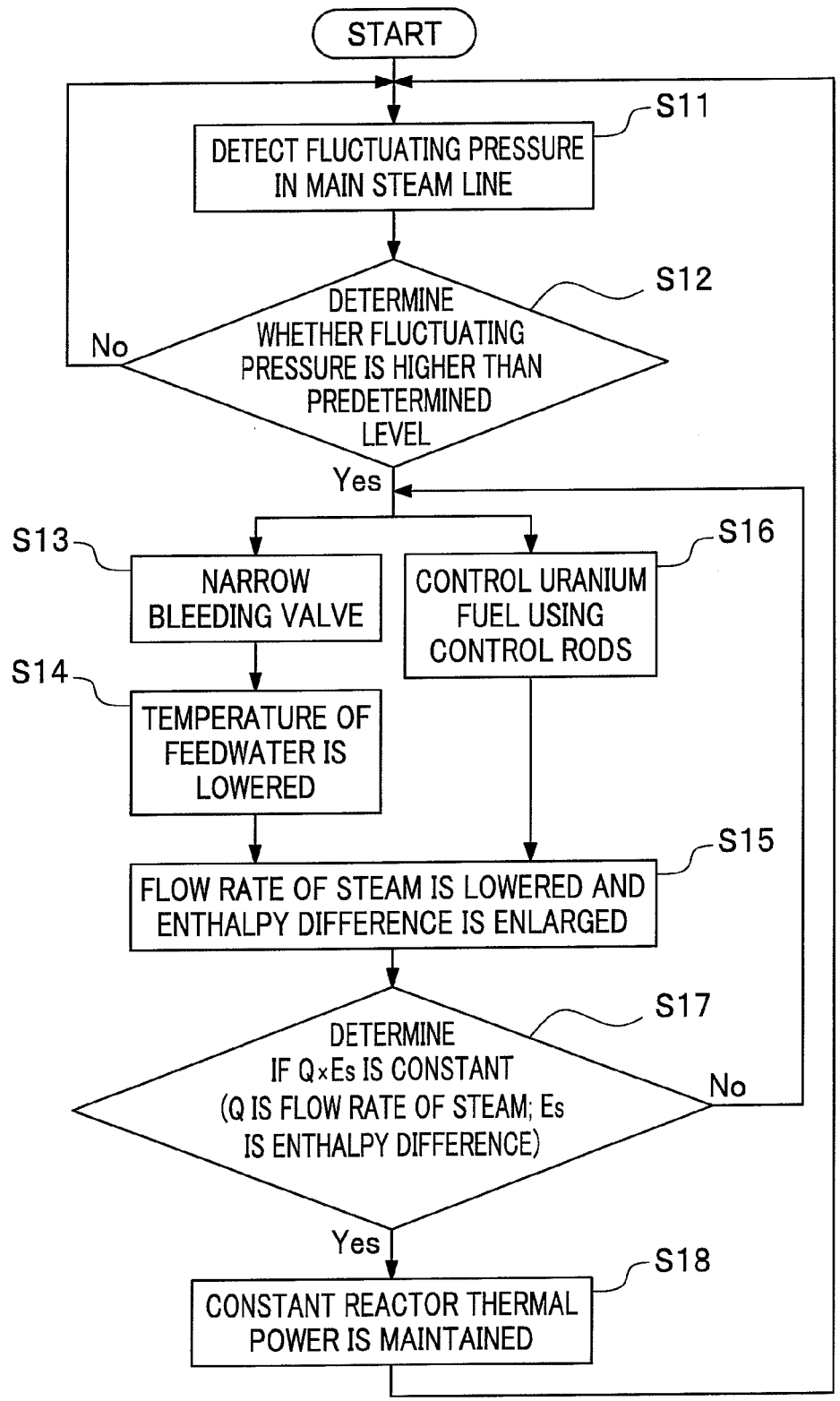
FIG. 4 is a flow chart showing the operation of the boiling water reactor shown in FIG. 3 for restricting pressure oscillation caused by acoustic resonance.

With reference to FIG. 4, the operation of the monitor and control system 19 in the boiling water reactor according to the second embodiment as shown in FIG. 3 will be described in a flow chart, in which the monitor and control system 19 restricts pressure oscillation caused by acoustic resonance while monitoring fluctuating pressure in the main steam line. A description will be given of the flow chart even for the steps similar to those previously described in the first embodiment in order to have a better understanding.

In step S11, the pressure sensor 17 or the pressure sensor 18 detects fluctuating pressure caused by acoustic resonance in the steam dome 7 or the steam pipe 8 (i.e., in the main steam line). The monitor and control system 19 then determines whether or not the detected fluctuating pressure is higher than a predetermined level (step S12). If the detected fluctuating pressure is not higher than the predetermined level, that is, if the fluctuating pressure is small (step S12; No), the pressure sensor 17 and the pressure sensor 18 continuously detect fluctuating pressure. If the detected fluctuating pressure is higher than the predetermined level (step 12; Yes), the monitor and control system 19 narrows or gradually closes the bleeding valve 14 to decrease the amount of steam supplied from the high pressure turbine 9 to the feedwater heater 13 (step S13).

The heating temperature of the feedwater heater 13 lowers by narrowing the bleeding valve 14, and therefore the temperature of feedwater 3 that is supplied from the condenser 12 to the reactor pressure vessel 1 through the feedwater heater 13 lowers (step S14). As a result, the amount of steam 4 generated in the reactor pressure vessel 1 is decreased, and so the flow rate of steam that is supplied from the steam dome 7 to the steam pipe 8 is also decreased. Further, the enthalpy difference between the inlet and the outlet of the reactor pressure vessel 1 is enlarged based on a temperature difference between the temperature of feedwater 3 supplied to the reactor pressure vessel 1 and the temperature of steam 4 supplied from the reactor pressure vessel 1 to the steam pipe 8 (step S15).

During this time, the monitor and control system 19 further controls the control rod drive 15, so that the control rod drive 15 controls a nuclear fission reaction of uranium fuel by means of the control rods 16 (step S16). By this operation, the amount of steam 4 generated in the reactor pressure vessel 1 is decreased, and so the flow rate of steam that is supplied from the steam dome 7 to the steam pipe 8 is also decreased (step S15).

The monitor and control system 19 then determines whether or not the product of the formula given by the flow rate of steam (Q)×the enthalpy difference (Es) is constant (step S17). If the product of Q×Es is not constant (step S17; No), the operation returns to step S13 and step S16, and the monitor and control system 19 repeats the same operations such as to control the bleeding valve 14 and to control the control rods 16, in order to maintain the product of Q×Es to a constant value.

Meanwhile, if the product of the formula given by the flow rate of steam (Q)×the enthalpy difference (Es) is constant in step S17 (step S17; Yes), a constant reactor thermal power can be maintained (step S18) notwithstanding that the flow rate of steam (Q) is lowered. To be more specific, when the amount of generated steam 4 is lowered (i.e., the flow rate of steam is lowered) by intentionally lowering the temperature (enthalpy) of feedwater 3 that is supplied to the reactor pressure vessel 1, the enthalpy difference between the inlet and the outlet of the reactor pressure vessel 1 is enlarged because the temperature (enthalpy) of steam 4 that is output from the outlet of the reactor pressure vessel 1 is constant. Therefore, it is possible to maintain the reactor thermal power given by the flow rate of steam (Q)×the enthalpy difference (Es) to a constant value.

Next, the operation returns to the beginning of the flow chart, and the pressure sensor 17 or the pressure sensor 18 detects fluctuating pressure caused by acoustic resonance (step S11) in the steam dome 7 or the steam pipe 8 (i.e., in the main steam line). The monitor and control system 19 then determines whether or not the detected fluctuating pressure is higher than a predetermined level (step S12). If the detected fluctuating pressure is not higher than the predetermined level, that is, if the fluctuating pressure is small (step S12; No), the pressure sensor 17 and the pressure sensor 18 continuously detect fluctuating pressure. If the detected fluctuating pressure is higher than the predetermined level (step 12; Yes), the monitor and control system 19 further narrows or gradually closes the bleeding valve 14 to decrease the amount of steam supplied from the high pressure turbine 9 to the feedwater heater 13 (step S13). Further, the monitor and control system 19 controls the control rod drive 15, so that the control rod drive 15 controls a nuclear fission reaction of uranium fuel by means of the control rods 16 (step S16).

Thus, decreasing the flow rate of steam flowing from the steam dome 7 to the steam pipe 8 makes it possible, without lowering the reactor thermal power, to restrict pressure oscillation generated in the main steam line including the steam dome 7 and the steam pipe 8, thereby restricting acoustic resonance.

To be more specific, in the boiling water reactor according to the second embodiment, if the value of fluctuating pressure detected by the pressure sensors 17, 18 provided in the steam dome 7 and in the steam pipe 8 exceeds the predetermined threshold value, the monitor and control system 19 narrows the bleeding valve 14 to restrict a flow of bleed steam flowing from the high pressure turbine 9 to the feedwater heater 13, so that the temperature of feedwater 3 supplied to the reactor pressure vessel 1 is lowered. Further, the monitor and control system 19 controls the control rod drive 15 so as to adjust the insertion rate of the control rods 16 into the uranium fuel, thereby controlling nuclear fission product energy. By these operations, since the flow rate of steam can be decreased by restricting the heating value inside the core shroud 2 and thus restricting the amount of generated steam, it is possible to decrease pressure oscillation caused by acoustic resonance in the steam dome 7 or in the steam pipe 8. During this time, even if the flow rate of steam is lowered, since the enthalpy difference between the inlet and the outlet of the reactor pressure vessel 1 is enlarged, it is possible to maintain the reactor thermal power defined by the flow rate of steam×the input/output enthalpy difference of the reactor pressure vessel 1 to a constant value.

In the boiling water reactor according to the second embodiment, the monitor and control system 19 controls the bleeding valve 14 and the control rods 16 as described above, so that the flow rate of steam can be decreased without decreasing the reactor thermal power to thereby restrict pressure oscillation caused by acoustic resonance. Therefore, even if the output power of the nuclear power plant is increased, it is possible to prevent the steam dryer (dryer) 6 or other equipment in the reactor pressure vessel 1 from being damaged. It is not necessary that the value of the reactor thermal power should be the same as the previous value before improvement in the output power. As long as pressure oscillation does not become greater than the allowable difference value, it is possible to set the reactor thermal power to a desired arbitrary value. For this reason, the control rod drive 15 may pull out the control rods 16 in step S16.

As described above, in the boiling water reactor according to the second embodiment, the monitor and control system 19 is further added to the conventional boiling water reactor. The monitor and control system 19 controls the opening degree of the bleeding valve 14 for adjusting a flow rate of bleed steam extracted from the high pressure turbine 9 to the feedwater heater 13 as well as controls the control rods 16 for controlling nuclear fission energy of the uranium fuel, so that the flow rate of steam passing through the main steam line can be adjusted and therefore pressure oscillation caused by acoustic resonance can be restricted in the end. During this time, even if the flow rate of steam (Q) is lowered, since the enthalpy difference (Es) is enlarged which is a temperature difference between the temperature of feedwater 3 that is supplied to the reactor pressure vessel 1 and the temperature of steam that is transported out from the rector pressure vessel 1 to the steam pipe 8, it is possible to maintain the product of the formula given by the enthalpy difference (Es)×the flow rate of steam (Q) to a constant value. Therefore, even if the flow rate of steam (Q) is decreased, the reactor thermal power output from the nuclear power plant can be maintained to a constant value. As a result, it is possible to build a nuclear power plant which maintains a high level of reliability while enabling further increased output power.

Next, with reference to the drawings, third to fifth embodiments of the present invention will be described in detail.

Overview

Paying attention to the fact that a main factor for pressure oscillation in a main steam line is acoustic resonance, a boiling water reactor according to the present invention calculates resonance frequency and sound pressure distribution in a main steam line by an acoustic analytical study for the main steam line, compares the analytical studying result of resonance frequency and sound pressure with an actual device fluctuating pressure measurement result, and determines an analytical studying condition such that the analytical studying result and the actual device fluctuating pressure measurement result are closest to each other. Oscillation inducing force applied to the steam dryer (dryer) is evaluated by the analytical studying condition in consideration of the actual device fluctuating pressure measurement result. A threshold value of sound pressure is determined by a fatigue evaluation. The threshold value is not for damaging the steam dryer and the like because of fatigue. Fluctuating pressure of the actual device is monitored using the threshold value of the sound pressure.

Third Embodiment

A boiling water reactor according to the third embodiment is substantially the same in construction with the boiling water reactor according to the first embodiment as shown in FIG. 1. However, a monitor system 20 is provided in place of the monitor and control system 19. Unlike the monitor and control system 19 according to the first embodiment, the monitor system 20 does not directly control the bleeding valve 14. Parts similar to those previously described in the first embodiment as shown in FIG. 1 are denoted by the same reference numerals, and detailed description thereof will be omitted.

Figure 5:
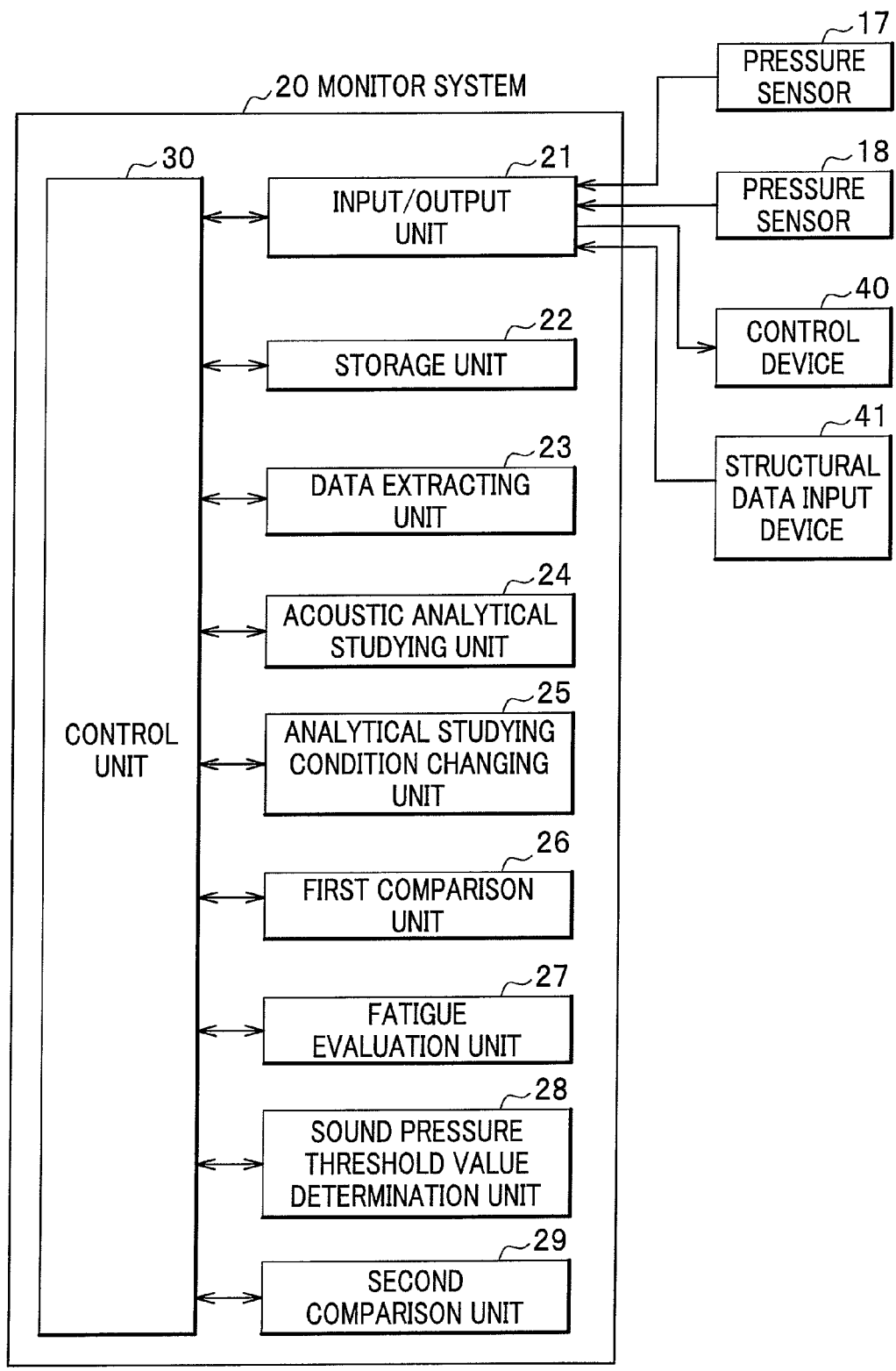
FIG. 5 is a block diagram illustrating a monitor system for a boiling water reactor according to a third embodiment of the present invention.

As shown in FIG. 5, the monitor system 20 includes an input/output unit 21 as an interface unit for inputting into and outputting from external devices (e.g., pressure sensor 17, pressure sensor 18, control device 40 for controlling fluctuating pressure, and structural data input device 41), a storage unit 22 for storing actual device fluctuating pressure measurement data, a data extracting unit 23 for extracting predetermined data from the storage unit 22, an acoustic analytical studying unit 24 for calculating resonance frequency in the main steam line and sound pressure distribution in the main steam line, an analytical studying condition changing unit 25 for changing an analytical studying condition for the acoustic analytical study, a first comparison unit 26 for comparing the analytical studying result with the actual device fluctuating pressure measurement result, a fatigue evaluation unit 27 for evaluating oscillation inducing force applied to the steam dryer (dryer) 6, a sound pressure threshold value determination unit 28 for determining the threshold value of sound pressure, a second comparison unit 29 for comparing the thus determined sound pressure threshold value with the actual device fluctuating pressure, and a control unit 30 for controlling these units 21-29. The control unit 30 is realized by a CPU of an information processing equipment operable by a program.

The storage unit 22 stores signals indicating fluctuating pressures detected by the pressure sensor 17 and the pressure sensor 18 through the input/output unit 21. The data extracting unit 23 extracts actual measurement data which is required by the first comparison unit 26 in accordance with a command from the control unit 30.

The acoustic analytical studying unit 24 calculates resonance frequency and sound pressure distribution in the main steam line by the acoustic analytical study for the main steam line with a predetermined analytical studying condition and based on the structural data input from the structural data input device 41. It is noted that the structural data may be stored previously in the storage unit 22. For example, if acoustic resonance modes each having resonance frequency are formed in the steam line extending from the steam dome 7 to the high pressure turbine 9 through the steam pipe 8, sound pressure distribution is calculated for each acoustic resonance mode. Acoustic resonance mode is calculated by a numerical calculation with an equation for compressed fluid or a sonic equation as a reference equation and using appropriate boundary condition, so that fluctuating pressure at each position of the steam dome 7 and the steam pipe 8 can be obtained. From the acoustic resonance mode can be obtained fluctuating pressure at each position of the pressure sensor 17 and the pressure sensor 18.

The analytical studying condition changing unit 25 stores analytical studying conditions for acoustic resonance oscillation which may affect the steam line, and by a command from the first comparison unit 26, it selects an analytical studying condition. The thus selected analytical studying condition is used by the acoustic analytical studying unit 24.

The first comparison unit 26 compares sound pressure that is obtained from the acoustic resonance mode calculated at the acoustic analytical studying unit 24 by the acoustic analytical study with fluctuating pressures at the measuring positions of the pressure sensors 17, 18. A determination is made as to whether the difference in the comparison between the analytical studying result and the actual measurement result is equal to or lower than a predetermined allowable difference value. As a manner of determination, it may be determined whether or not a mean square error is within a predetermined error.

If the difference in the comparison at the first comparison unit 26 is equal to or lower than the predetermined allowable difference value, the fatigue evaluation unit 27 calculates oscillation inducing force applied to the surface of a structure using this acoustic analytical studying result. To be more specific, the fatigue evaluation unit 27 calculates the oscillation inducing force applied to the surface of the steam dryer 6, obtains fluctuating pressure distribution applied to the surface of the steam dryer 6, and obtains stress distribution caused in the steam dryer 6 based on the thus obtained fluctuating pressure distribution.

The sound pressure threshold value determination unit 28 calculates threshold pressure amplitudes of the pressure sensors 17, 18 that are required for the structure to reach a fatigue fracture free stress. To be mores be specific, the sound pressure threshold value determination unit 28 calculates threshold pressure amplitudes of the pressure sensors 17, 18 that are required for the steam dryer 6 to reach the fatigue fracture free stress. Since the pressure sensor 17 and the pressure sensor 18 are installed at different positions, it is necessary to calculate respective threshold pressure amplitudes for the pressure sensors 17, 18.

The second comparison unit 29 monitors whether or not the fluctuating pressure amplitudes obtained by the fluctuating pressure signals from the pressure sensors 17, 18 are equal to or lower than the corresponding threshold pressure amplitudes calculated at the sound pressure threshold value determination unit 28. In order to prevent a fatigue fracture of the structure, if a fluctuating pressure amplitude from a sensor is more than the threshold pressure amplitude, through the input/output unit 21 the second comparison unit 29 transmits a restriction control command to the control device 40 for restricting acoustic resonance oscillation or transmits a warning command.

Next, operation of the boiling water reactor according to the third embodiment will be described below.

Figure 6:
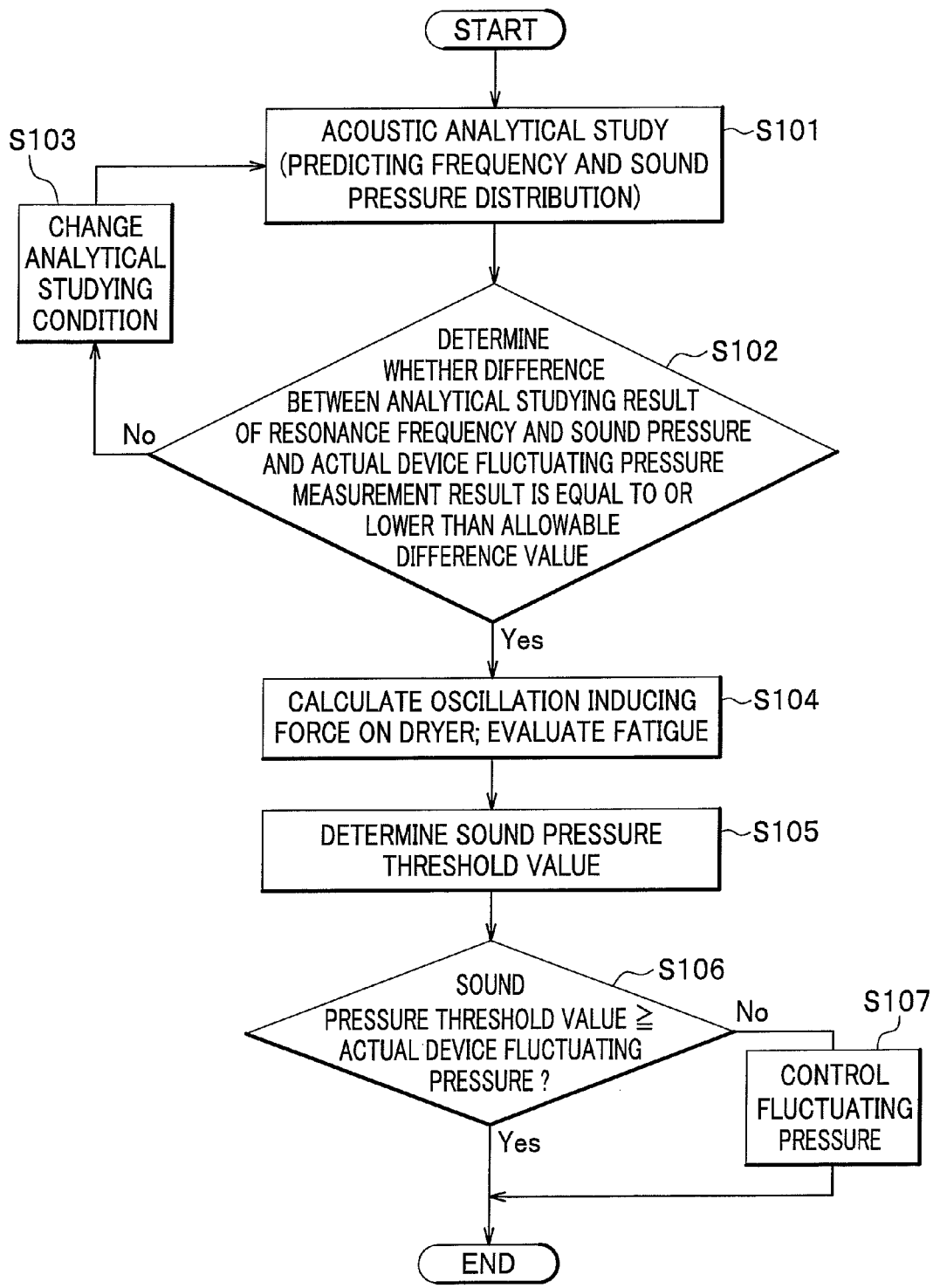
FIG. 6 is a flow chart showing the operation of the monitor system shown in FIG. 5 for monitoring pressure oscillation.

As shown in FIG. 6, the acoustic analytical studying unit 24 calculates and obtains sound pressure distribution in an acoustic resonance mode having resonance frequency in the steam line extending from the steam dome 7 to the high pressure turbine 9 through the steam pipe 8 (step S101).

The data extracting unit 23 processes a fluctuating pressure signal from the pressure sensor 17 or the pressure sensor 18 (or processes fluctuating pressure signals from both of the pressure sensors 17, 18) to calculate and obtain resonance frequency and fluctuating pressure distribution. The first comparison unit 26 compares the result obtained at the acoustic analytical studying unit 24 and the result obtained from the data extracting unit 23, and then determines whether or not the difference in the comparison is equal to or lower than the allowable difference value (step S102).

If the difference at the first comparison unit 26 is more than the allowable difference value, an analytical studying condition changing command is transmitted to the analytical studying condition changing unit 25. When the analytical studying condition changing unit 25 receives the analytical studying condition changing command, it selects an appropriate analytical studying condition in consideration of the previous analytical studying condition and then transmits a command to the acoustic analytical studying unit 24 (step S103).

If the difference at the first comparison unit 26 is equal to or lower than the allowable difference value, the fatigue evaluation unit 27 calculates oscillation inducing force applied to the surface of the steam dryer 6 using the acoustic analytical studying result at the acoustic analytical studying unit 24, obtains fluctuating pressure distribution applied to the surface of the steam dryer 6, calculates oscillation inducing force applied to the surface of the steam dryer 6 based on the thus obtained fluctuating pressure distribution, and obtains stress distribution caused in the steam dryer 6 (step S104).

The sound pressure threshold value determination unit 28 calculates threshold pressure amplitudes of the pressure sensor 17 and the pressure sensor 18 that are required for the steam dryer 6 to reach the fatigue fracture free stress, based on the stress distribution caused in the steam dryer 6 (step S105).

The second comparison unit 29 always monitors by on-line as to whether or not fluctuating pressure amplitudes obtained from the fluctuating pressure signals of the pressure sensors 17, 18 are equal to or lower than the threshold pressure amplitude obtained at the sound pressure threshold value determination unit 28 (step S106).

If the fluctuating pressure amplitudes from the pressure sensors 17, 18 are more than the threshold pressure amplitude, in order to prevent a fatigue fracture of the structure, through the input/output unit 21 the second comparison unit 29 transmits the restriction control command to the control device 40 for restricting acoustic resonance oscillation or transmits the warning command (step S107).

According to this embodiment, the acoustic analytical studying unit 24 calculates resonance frequency and sound pressure distribution in the main steam line by the acoustic analytical study for the main steam line, and the first comparison unit 26 compares the analytical studying result of resonance frequency and sound pressure with those values of the actual device fluctuating pressure measurement result. The analytical studying condition is determined such that the result obtained at the acoustic analytical studying unit 24 and the actual device fluctuating pressure measurement result are closest to each other (i.e., not more than the allowable difference value). Oscillation inducing force applied to the steam dryer 6 is evaluated by the analytical studying condition in consideration of the actual device fluctuating pressure measurement result. The threshold value of sound pressure, under which the steam dryer 6 would not damage because of fatigue, such as threshold pressure amplitudes of the pressure sensors 17, 18, is determined by the fatigue evaluation. Fluctuating pressure of the actual device is monitored using the threshold value of the sound pressure. Therefore, the boiling water reactor can be monitored in a reliable manner, while preventing the steam dryer 6, etc. inside the reactor pressure vessel from being damaged due to pressure oscillation caused by acoustic resonance that is generated in the main steam line.

Fourth Embodiment

According to this preferred embodiment, a boiling water reactor calculates resonance frequency and sound pressure distribution in the main steam line by an acoustic analytical study for the main steam line, compares the analytical studying result of resonance frequency and sound pressure with an actual device fluctuating pressure measurement result, and determines an analytical studying condition such that the analytical studying result and the actual device fluctuating pressure measurement result are closest to each other (i.e., not more than the allowable difference value). Fluctuating pressure distribution applied to the surface of a structure (e.g., surface of the steam dryer) in the steam line is calculated by the analytical studying condition in consideration of the actual device fluctuating pressure measurement result. Stress distribution caused in the structure is then obtained based on the thus obtained fluctuating pressure distribution on the surface of the structure. Using a predetermined allowable difference value of the fatigue fracture free stress for the subject structure, fluctuating pressure of the actual device is monitored.

Figure 7:
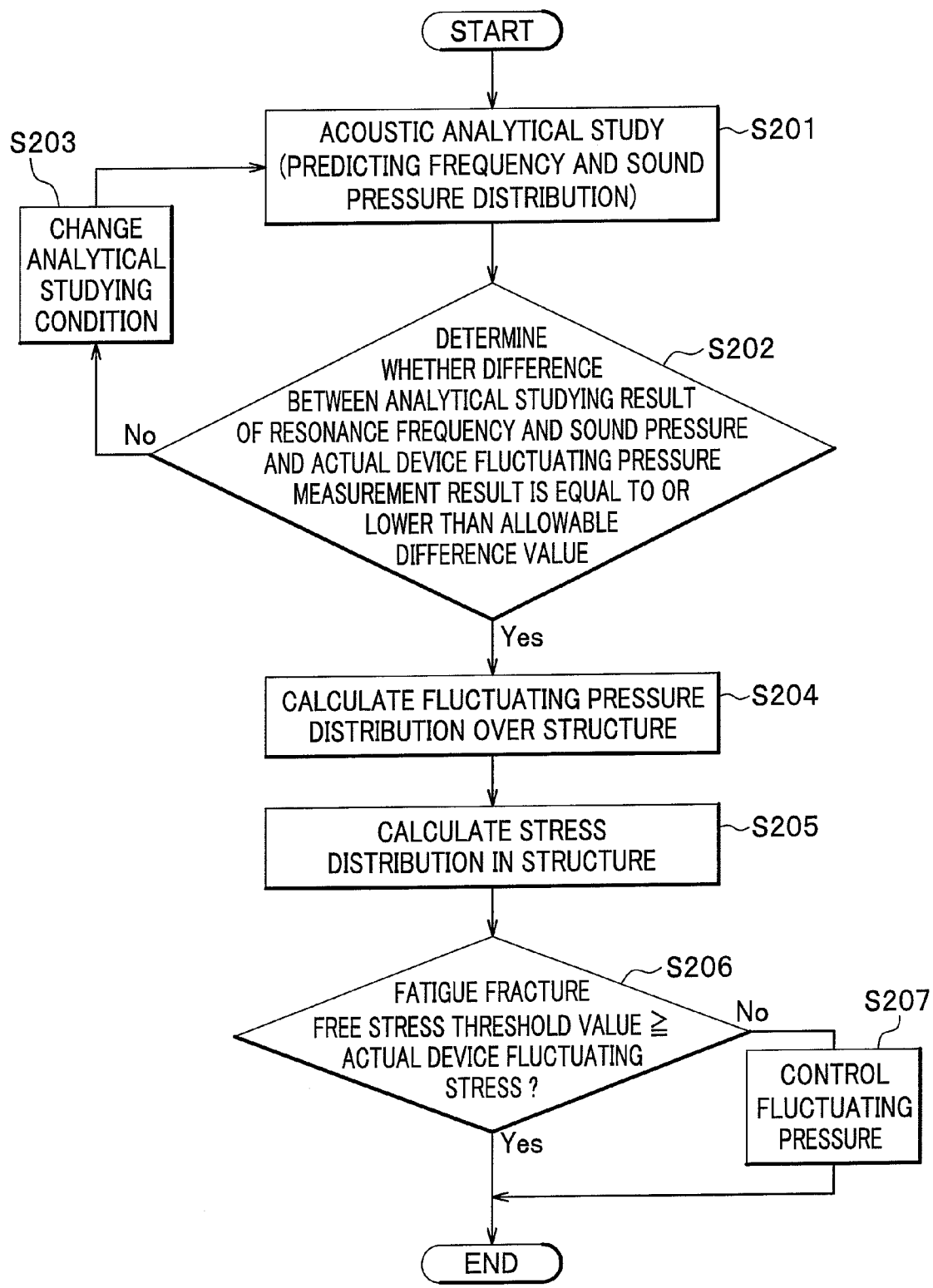
FIG. 7 is a flow chart showing the operation for monitoring pressure oscillation according to a fourth embodiment of the present invention.

A flow chart shown in FIG. 7 is substantially the same as the flow chart shown in FIG. 6 except for steps S204, S205 and S206. In this fourth embodiment, the monitor system 20 can be also used. By changing the settings of the control program for the monitor system 20, the sound pressure threshold value determination unit 28 can set a fatigue fracture free stress threshold value for the structure.

The acoustic analytical studying unit 24 calculates and obtains sound pressure distribution in an acoustic resonance mode having resonance frequency in the steam line extending from the steam dome 7 to the high pressure turbine 9 through the steam pipe 8 (step S201).

The data extracting unit 23 processes a fluctuating pressure signal from the pressure sensor 17 or the pressure sensor 18 (or processes fluctuating pressure signals from both of the pressure sensors 17, 18) to calculate and obtain resonance frequency and fluctuating pressure distribution. The first comparison unit 26 compares the result obtained at the acoustic analytical studying unit 24 and the result obtained from the data extracting unit 23, and then determines whether or not the difference in the comparison is equal to or lower than the allowable difference value (step S202).

If the difference in the comparison at the first comparison unit 26 is more than the allowable difference value, an analytical studying condition changing command is transmitted to the analytical studying condition changing unit 25. When the analytical studying condition changing unit 25 receives the analytical studying condition changing command, it selects an appropriate analytical studying condition in consideration of the previous analytical studying condition and then transmits a command to the acoustic analytical studying unit 24 (step S203).

If the difference in the comparison at the first comparison unit 26 is equal to or lower than the allowable difference value, the fatigue evaluation unit 27 calculates oscillation inducing force applied to the surface of the steam dryer 6 using the acoustic analytical studying result at the acoustic analytical studying unit 24, and obtains fluctuating pressure distribution applied to the surface of the steam dryer 6 (step S204).

The fatigue evaluation unit 27 calculates and obtains stress distribution of the steam dryer 6 based on the fluctuating pressure distribution applied to the surface of the steam dryer 6 (step S205).

The second comparison unit 29 always monitors by on-line as to whether or not the stress distribution calculated in step S205 is equal to or lower than the fatigue fracture free stress threshold value that is set at the sound pressure threshold value determination unit 28 (step S206).

If the stress estimated from the stress distribution calculated in step S205 is more than the fatigue fracture free stress threshold value, in order to prevent a fatigue fracture of the structure, through the input/output unit 21 the second comparison unit 29 transmits the restriction control command to the control device 40 for restricting acoustic resonance oscillation or transmits the warning command (step S207).

According to this embodiment, fluctuating pressure that is calculated using the fatigue fracture free stress threshold value of the structure is monitored. Therefore, the boiling water reactor can be monitored in a reliable manner, while preventing the steam dryer 6, etc. inside the reactor pressure vessel from being damaged due to pressure oscillation caused by acoustic resonance that is generated in the main steam line.

Fifth Embodiment

While the threshold value of sound pressure is determined on-line according to the third embodiment, according to this fifth embodiment, the threshold value of sound pressure (e.g., threshold pressure amplitude) is determined off-line in advance, and fluctuating pressure amplitude of the actual device is monitored by on-line using the threshold value of the sound pressure.

Figure 8A:
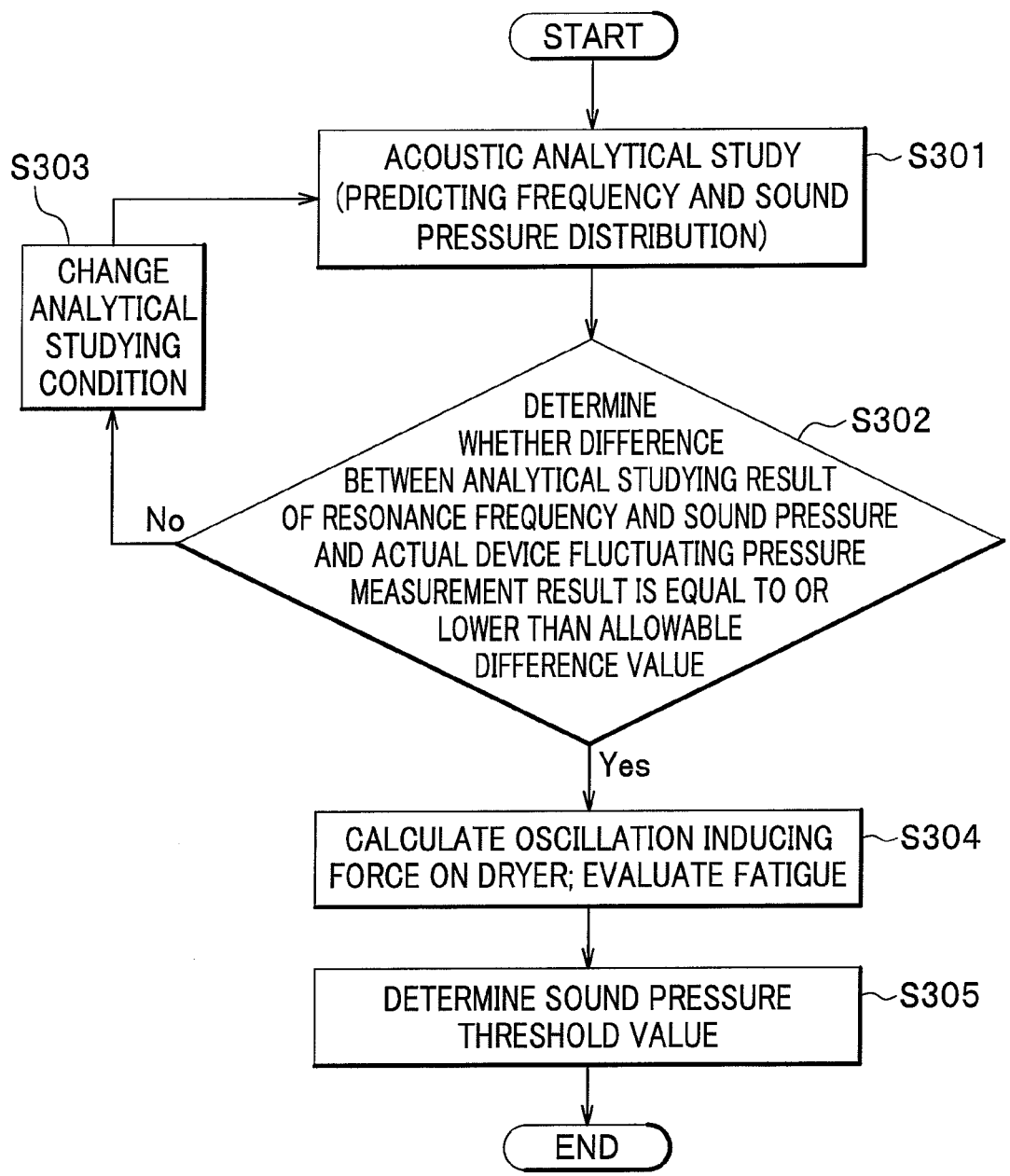
FIGS. 8A and 8B are flow charts showing the operation for monitoring pressure oscillation according to a fifth embodiment of the present invention.
Figure 8B:
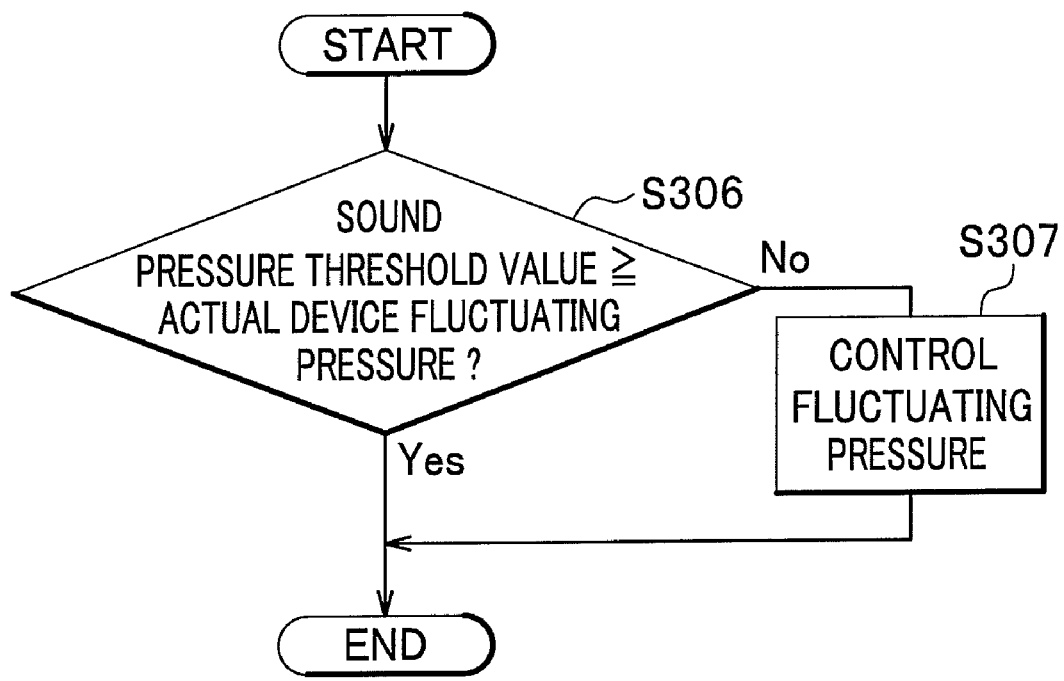

The flow chart shown in FIG. 8A indicates processes to be processed by an off-line information processing device (not shown), whereas the flow chart shown in FIG. 8B indicates processes to be processed by the monitor system 20. To be more specific, the off-line information processing device is realized by an information processing device such as a work station and a personal computer.

A control unit of the off-line information processing device (hereinafter referred to as an information processing control unit) calculates and obtains, using structural design data, sound pressure distribution in an acoustic resonance mode having resonance frequency in the steam line extending from the steam dome 7 to the high pressure turbine 9 through the steam pipe 8 (step S301).

The information processing control unit processes fluctuating pressure signals from the pressure sensors 17, 18 that can be obtained in advance, and calculates resonance frequency and sound pressure distribution. The information processing control unit compares the analytical studying result and the result obtained from measurement data, and then determines whether or not the difference in the comparison is equal to or lower than the allowable difference value (step S302). Preferably, the measurement data from the pressure sensor 17 and the pressure sensor 18 contain plural pieces of measurement data such as data upon initial operation of the reactor, and data upon driving on a predetermined output power.

If the difference is more than the allowable difference value, the information processing control unit changes the analytical studying condition (step S303).

If the difference is equal to or lower than the allowable difference value, the information processing control unit calculates oscillation inducing force applied to the surface of the steam dryer 6 using the acoustic analytical studying result, calculates fluctuating pressure distribution applied to the surface of the steam dryer 6, and obtains stress distribution caused in the steam dryer 6 based on the thus obtained fluctuating pressure distribution (step S304).

The information processing control unit then calculates and obtains threshold pressure amplitudes of the pressure sensors 17, 18 that are required for the steam dryer 6 to reach the fatigue fracture free stress, based on the stress distribution caused in the steam dryer 6 (step S305).

The threshold pressure amplitudes obtained in step S305 are set in the sound pressure threshold value determination unit 28 of the monitor system 20. Setting of the threshold pressure amplitudes may be performed by an administrator. Alternatively, the off-line information processing device may transmit the threshold pressure amplitudes through a communication line to set them in the monitor system 20.

The second comparison unit 29 of the monitor system 20 always monitors by on-line as to whether or not fluctuating pressure amplitudes obtained by the fluctuating pressure signals from the pressure sensors 17, 18 are equal to or lower than the threshold pressure amplitudes that are set in the sound pressure threshold value determination unit 28 (step S306).

If the fluctuating pressure amplitudes from the pressure sensors 17, 18 are more than the threshold pressure amplitudes, in order to prevent a fatigue fracture of the structure, through the input/output unit 21 the second comparison unit 29 transmits the restriction control command to the control device 40 for restricting acoustic resonance oscillation or transmits the warning command (step S307).

In this fifth embodiment, functions performed by the off-line information processing device (i.e., the acoustic analytical studying unit 24, the analytical studying condition changing unit 25, the first comparison unit 26, and the fatigue evaluation unit 27) may be omitted from the monitor system 20.

According to the fifth embodiment, the off-line information processing device calculates resonance frequency and sound pressure distribution in the main steam line by the acoustic analytical study for the main steam line, compares the analytical studying result of resonance frequency and sound pressure with those values of the actual device fluctuating pressure measurement result, and determines the analytical studying condition such that the analytical studying result and the actual device fluctuating pressure measurement result are closest to each other (i.e., not more than the allowable difference value). Oscillation inducing force applied to the steam dryer 6 is evaluated by the analytical studying condition in consideration of the actual device fluctuating pressure measurement result. The off-line information processing device determines the threshold value of sound pressure (e.g., threshold pressure amplitudes of the pressure sensors 17, 18) under which the steam dryer 6 would not damage because of fatigue by performing the fatigue evaluation. Fluctuating pressure of the actual device is monitored using the threshold value of the sound pressure. Therefore, the boiling water reactor can be monitored in a reliable manner, while preventing the steam dryer 6, etc. inside the reactor pressure vessel from being damaged due to pressure oscillation caused by acoustic resonance that is generated in the main steam line.

What is claimed is:

1. A boiling water reactor comprising:
a reactor pressure vessel;
a control rod drive configured to drive and control control rods;
a steam pipe configured to transport steam generated in the reactor pressure vessel out from a steam dome positioned at an upper part of the reactor pressure vessel;
a high pressure turbine connected to the steam pipe and driven by the steam;
a feedwater heater configured to heat feedwater supplied to the reactor pressure vessel using bleed steam flowing from the high pressure turbine to the feedwater heater;
a bleeding valve configured to adjust a flow rate of the bleed steam supplied to the feedwater heater;
a detector provided in a main steam line including the steam dome and the steam pipe and configured to detect a fluctuating pressure in the steam dome,
feedwater temperature determining means for determining a temperature of the feedwater that is supplied from the feedwater heater to the reactor pressure vessel;
steam temperature determining means for determining a temperature of steam that is transported out from the reactor pressure vessel, and
flow rate determining means for determining a flow rate of steam that is transported out from the reactor pressure valve,
wherein the boiling water reactor further comprises a monitor and control means for checking whether or not the fluctuating pressure detected by the detector is larger than a predetermined level and whether or not a product given by Es×Q is constant, where Es is an enthalpy difference based on a difference between the temperature of the feedwater that is supplied from the feedwater heater to the reactor pressure vessel, determined by the feedwater temperature determining means, and a temperature of steam that is transported out from the reactor pressure vessel determined by the steam temperature determining means, and Q is a flow rate of steam that is transported out from the reactor pressure vessel determined by the flow rate determining means.

2. A boiling water reactor according to claim 1, wherein, if the fluctuating pressure of the main steam line detected by the detector is larger than the predetermined level, the monitor and control means lowers the temperature of the feedwater that is supplied from the feedwater heater to the reactor pressure vessel by decreasing an opening degree of the bleeding valve.

3. A boiling water reactor according to claim 1, wherein, if the fluctuating pressure of the main steam line detected by the detector is larger than the predetermined level, the monitor and control means lowers the temperature of the feedwater that is supplied from the feedwater heater to the reactor pressure vessel by decreasing an opening degree of the bleeding valve, as well as lowers an amount of generating steam by controlling nuclear fission product energy of the uranium fuel by controlling the control rod drive.

* * * * *